United States Patent
Tanoue

(10) Patent No.: US 7,486,934 B2
(45) Date of Patent: Feb. 3, 2009

(54) SERVICE AREA DETERMINATION METHOD FOR DETERMINING WHETHER A MOBILE TERMINAL IS IN THE SERVICE AREA OF A REPEATER OR IN THE SERVICE AREA OF A RADIO BASE STATION

(75) Inventor: Katsumi Tanoue, Minato-ku (JP)

(73) Assignee: NEC Corporation, Tokyo (JP)

( * ) Notice: Subject to any disclaimer, the term of this patent is extended or adjusted under 35 U.S.C. 154(b) by 588 days.

(21) Appl. No.: 11/156,546

(22) Filed: Jun. 21, 2005

(65) Prior Publication Data
US 2006/0019661 A1    Jan. 26, 2006

(30) Foreign Application Priority Data
Jul. 1, 2004    (JP)    ............................ 2004-195547

(51) Int. Cl.
*H04B 17/00*    (2006.01)
(52) U.S. Cl. ........................... 455/67.16; 455/9; 455/16; 455/456.1; 455/13.1; 370/315; 370/279; 370/501
(58) Field of Classification Search ............. 455/226.1, 455/67.11, 456.1, 404.2, 436, 442, 7, 16, 455/9, 18, 67.16, 67.14, 424, 524, 525, 13.1, 455/435.2, 440, 17, 11.1; 370/315, 321, 370/279, 322, 323, 326, 328, 329, 331, 337, 370/345, 347, 276, 280, 498, 501, 502, 277
See application file for complete search history.

(56) References Cited

U.S. PATENT DOCUMENTS 5,910,943 A * 6/1999 Wickman ................... 370/279
7,158,790 B1 * 1/2007 Elliott ........................ 455/446
2002/0160798 A1 * 10/2002 Shoji et al. .................. 455/522
2003/0083008 A1 * 5/2003 Baker et al. .................. 455/17
2004/0029558 A1 * 2/2004 Liu .......................... 455/404.2
2005/0124374 A1 * 6/2005 Riley et al. ................. 455/525

FOREIGN PATENT DOCUMENTS

| | | | |
|---|---|---|---|
| GB | 2346511 A | * | 12/1999 |
| JP | 02-193425 A | | 7/1990 |
| JP | 2001-274745 A | | 10/2001 |

(Continued)

*Primary Examiner*—Sujatha Sharma
(74) *Attorney, Agent, or Firm*—Sughrue Mion, PLLC

(57) ABSTRACT

A propagation delay-propagation loss table is stored in advance in a radio base station, a first area and a second area being set in advance in the propagation delay-propagation loss table, the first area being predicted to contain the relation between the propagation delay and propagation loss when a mobile station is not within the service area of a repeater, while in the second area the effect of the control delay and power gain caused by the repeater upon this first area is taken into consideration. In the radio base station, it is then determined that a mobile station is within the service area of the radio base station when the relation between the propagation loss value that has been reported from the mobile station and the propagation delay that has been calculated is contained within the first area, and it is determined that the mobile station is within the service area of the repeater when the relation is contained within the second area.

8 Claims, 6 Drawing Sheets

FOREIGN PATENT DOCUMENTS

| | | |
|---|---|---|
| JP | 2002-209241 A | 7/2002 |
| JP | 2002-524966 A | 8/2002 |
| JP | 2003-189351 A | 7/2003 |
| WO | WO0014906 * | 3/2000 |
| WO | WO 02/059638 A2 | 8/2002 |
| WO | WO 03/039037 A1 | 5/2003 |

* cited by examiner

SERVICE AREA DETERMINATION METHOD FOR DETERMINING WHETHER A MOBILE TERMINAL IS IN THE SERVICE AREA OF A REPEATER OR IN THE SERVICE AREA OF A RADIO BASE STATION

BACKGROUND OF THE INVENTION

1. Field of the Invention

The present invention relates to a determination method in a CDMA mobile communication system that uses radio repeaters for determining whether a mobile station is within the service area of a repeater or within the service area of a radio base station.

2. Description of the Related Art

In a mobile communication system that uses the CDMA method, a plurality of methods that use the difference in propagation delay between a radio base station and a mobile station have been adopted as methods for detecting the position information of a mobile station (for example, RTD: Relative Time Difference, OTDOA: Observed Time Difference of Arrival). One method among these methods is disclosed in Japanese Patent Laid-Open Publication No. 2003-189351. In this method, the propagation delay differences between a mobile station and a plurality of (three or more) radio base stations are measured and the spatial position of the mobile station then calculated based on this information.

When calculating the transmission power of a physical channel that is used in radio communication between a mobile station and a radio base station, the propagation loss value of the radio propagation path between the radio base station and the mobile station is used. More specifically, the determination of the value of initial transmission power of the Dedicated Physical CHannels (DPCH) and the determination of the value of the transmission power of the Forward Access CHannel (FACH) in a CDMA mobile communication system are carried out by the following procedures:

(1) The radio base station reports the transmission power value of the Primary Common Pilot CHannel (PCPICH) by means of report information.

(2) The mobile station measures the reception power value of the pilot channel (PCPICH) in its own area.

(3) The mobile station reports the reception power value of the PCPICH to the radio base station by means of a Random Access CHannel (RACH).

(4) The radio base station estimates the propagation loss between the radio base station and the mobile station from the difference between the value of the PCPICH transmission power ((1) above) and the value of the reception power that was reported from the mobile station ((2) above).

(5) The radio base station calculates the initial transmission power value from the calculated propagation loss.

This accurate measurement of the propagation loss and the propagation delay on the propagation path between the radio base station and mobile station is necessary for the various types of control of the mobile communication system such as the detection of position information of the mobile station or the control of transmission power.

However, when this type of method is applied to a CDMA mobile communication system that uses radio repeaters, the problem arises that propagation delay and propagation loss cannot be accurately measured. Such a mobile communication system that uses repeaters is described in, for example, Japanese Patent Laid-Open Publication No. 2001-274745, in which repeaters are arranged between a radio base station and a mobile station whereby new service areas are provided that are different from the service area of the radio base station. In a mobile communication system in which repeaters are arranged within the service area that is provided by a radio base station, signals are transmitted and received by way of a radio base station, a repeater and then a mobile station when a mobile station is within the service area of a repeater.

The control delay of the radio signals in the repeater that consequently occurs in the propagation path that passes by way of the repeater therefore causes the problem of preventing the accurate estimation of the propagation delay between the radio base station and the mobile station. In the above-described service of detecting the position information of the mobile station, the inability to accurately estimate the propagation delay in turn prevents the accurate estimation of the position information of the mobile station.

In addition, the method of calculating the initial transmission power of the above-described prior art is based on the assumption that the propagation loss in the downlink direction (the direction from the radio base station to the mobile station) and the propagation loss in the uplink direction (the direction from the mobile station to the radio base station) are equivalent. However, in a radio link in which a repeater is interposed, the gain in the repeater cannot be assumed to be equal in the downlink direction and the uplink direction, and this imbalance may in turn prevent the adequate determination of the transmission power value.

A CDMA mobile communication system of the prior art in which repeaters are arranged between radio base stations and mobile stations therefore has the following problems:

(1) When attempting to detect position information of a mobile station by measuring the propagation delay between a radio base station and the mobile station, the control delay of radio signals that occurs in a repeater prevents the accurate estimation of the propagation delay between the radio base station and the mobile station in a propagation path that passes by way of a repeater and thus prevents the proper detection of position information.

(2) When attempting to measure the propagation loss between a radio base station and a mobile station, the possibility for inequality of the gain in a repeater in the downlink and uplink directions in a propagation path that passes by way of a repeater prevents the accurate measurement of the propagation loss, and prevents the realization of adequate transmission power control.

However, the control delay, which is the amount of delay in a repeater, is a value that is known in advance; and reporting the radio gain, which is the gain by which radio signals are amplified in a repeater, from the repeater to the radio base station allows a radio base station to ascertain the degree of amplification in the repeater for uplink and downlink lines. Thus, if it can be determined whether a mobile station is currently within the service area of a radio base station or within the service area of a repeater, a radio base station should be able to more accurately estimate the propagation loss and propagation delay between the radio base station and the mobile station. However, a method has yet to be proposed for determining in a radio base station whether a mobile station is currently within the service area of a radio base station or within the service area of a repeater.

SUMMARY OF THE INVENTION

It is an object of the present invention to provide a service area determination method in a CDMA mobile communication system that uses repeaters, the service area determination method being directed to enabling determination of whether a mobile station is within the service area of a repeater or within the service area of a radio base station.

The present invention is applied to a service area determination method in a CDMA mobile communication system that uses repeaters and is directed to determining in a radio base station whether a mobile station is within the service area of a repeater or within the service area of a radio base station.

To achieve the above-described object in the service area determination method of the present invention, a propagation delay-propagation loss table is stored in advance in a radio base station, and a first area and a second area are set in advance in this propagation delay-propagation loss table, the first area being an area that can be predicted to contain the relation between the propagation delay and propagation loss when a mobile station is within the service area of a radio base station, and the second area being an area in which the effect of the control delay and power gain of a repeater upon the first area is taken into consideration.

In the radio base station, the propagation delay is calculated using the difference in timing between a downlink dedicated physical control channel and an uplink dedicated physical control channel.

It is further determined whether the relation between the propagation loss value that is reported from a mobile station to a radio base station and the propagation delay that has been calculated in the radio base station is contained in the first area or contained in the second area in the propagation delay-propagation loss table.

If the relation between the propagation delay and propagation loss value is included in the first area in the propagation delay-propagation loss table, the mobile station is determined to be within the service area of a radio base station, and if included in the second area, the mobile station is determined to be within the service area of a repeater.

According to the present invention, the relation between the propagation delay that has been measured and the propagation loss that has been reported from a mobile station is compared in a radio base station with a propagation delay-propagation loss table that has been stored in advance, whereby it can be determined whether the mobile station is within the service area of a repeater or within the service area of a radio base station. If it is determined that the mobile station is within the service area of a repeater, a correction of the propagation delay that has been measured and propagation loss that has been reported from the mobile station can be implemented in the radio base station, this correction taking into consideration the control delay and the radio gain of the repeater to enable more accurate detection of the propagation delay and propagation loss between the radio base station and mobile station, and to enable more appropriate implementation of position information detection and transmission power control of the mobile station.

In addition, the step of using the difference in timing between a downlink dedicated physical control channel and an uplink dedicated physical control channel to calculate propagation delay in the radio base station may be: a step of using the downlink-uplink timing offset, which is the timing difference between the uplink radio line and the downlink radio line that are prescribed by the system to calculate the propagation delay by means of the equation:

$$\{(\text{timing difference between downlink dedicated physical control channel and uplink dedicated physical control channel}) - (\text{downlink-uplink timing offset})\}/2$$

Still further, the step of determining whether the relation between the propagation loss that has been reported from the mobile station to the radio base station and the propagation delay that has been calculated in the radio base station is contained within the first area or contained within the second area in the propagation delay-propagation loss table may be: a step of using a determination threshold value curve that is set between the first area and the second area, whereby the relation between the propagation loss value and the propagation delay is determined to be contained within the first area when the relation between the propagation loss value and propagation delay is on the first-area side of the determination threshold value curve; and the relation between the propagation loss value and the propagation delay is determined to be included within the second area when the relation between the propagation loss value and the propagation delay is on the second-area side from the determination threshold value curve.

Still further, the radio base station may use power gain information that has been reported from the repeater to periodically update the second area of the stored propagation delay-propagation loss table.

According to the present invention, the service area can be accurately determined even when the power gain of a repeater changes with the passage of time.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Embodiments of the present invention are next described in detail with reference to the accompanying Figures.

First Embodiment

Figure 1:
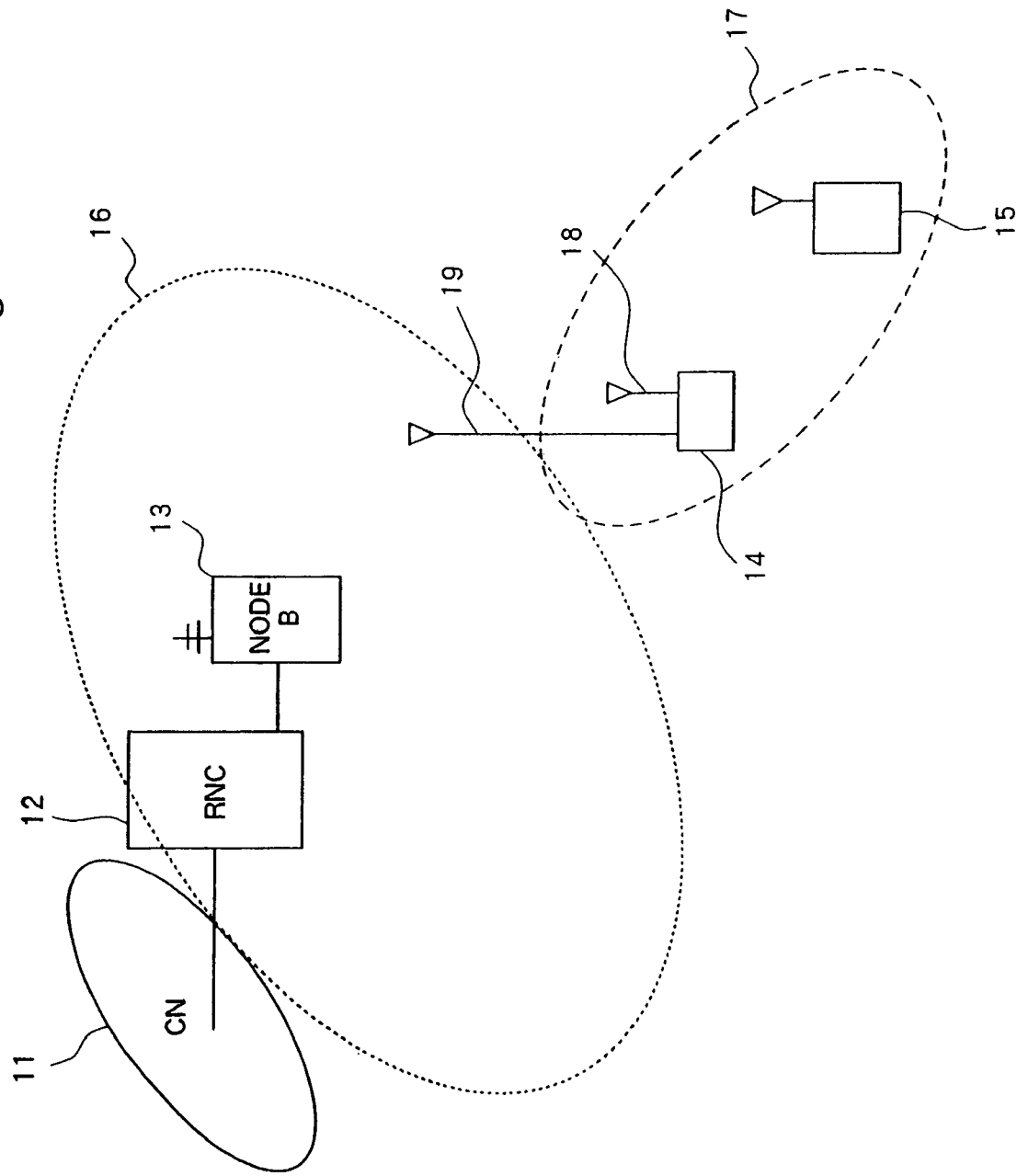
FIG. 1 shows a mobile communication network that uses repeaters.

FIG. 1 is a view showing the configuration of a CDMA mobile communication system that uses repeaters according to the first embodiment of the present invention.

As shown in FIG. 1, the CDMA mobile communication system in the first embodiment is made up from: mobile communication exchange network (hereinbelow referred to as Core Network, abbreviated CN) 11, radio base station controller (hereinbelow referred to as Radio Network Controller, abbreviated RNC) 12; a radio base station device (hereinbelow referred to as Node B) 13 that is subordinate to RNC 12; a radio repeating device (hereinbelow referred to as a repeater) 14 that is arranged within service area 16 that is constructed by each Node B 13 for the bidirectional reception, amplification, and transmission of radio signals between radio base stations and mobile stations; and mobile station 15 that is present within service area 17 that is produced by repeater 14.

Mobile terminal 15 that is present within service area 17 communicates by way of reception antenna 19 and transmission antenna 18 that are provided in repeater 14 and accesses CN 11 by way of repeater 14, Node B 13, and RNC 12 to access the public network.

Figure 2:
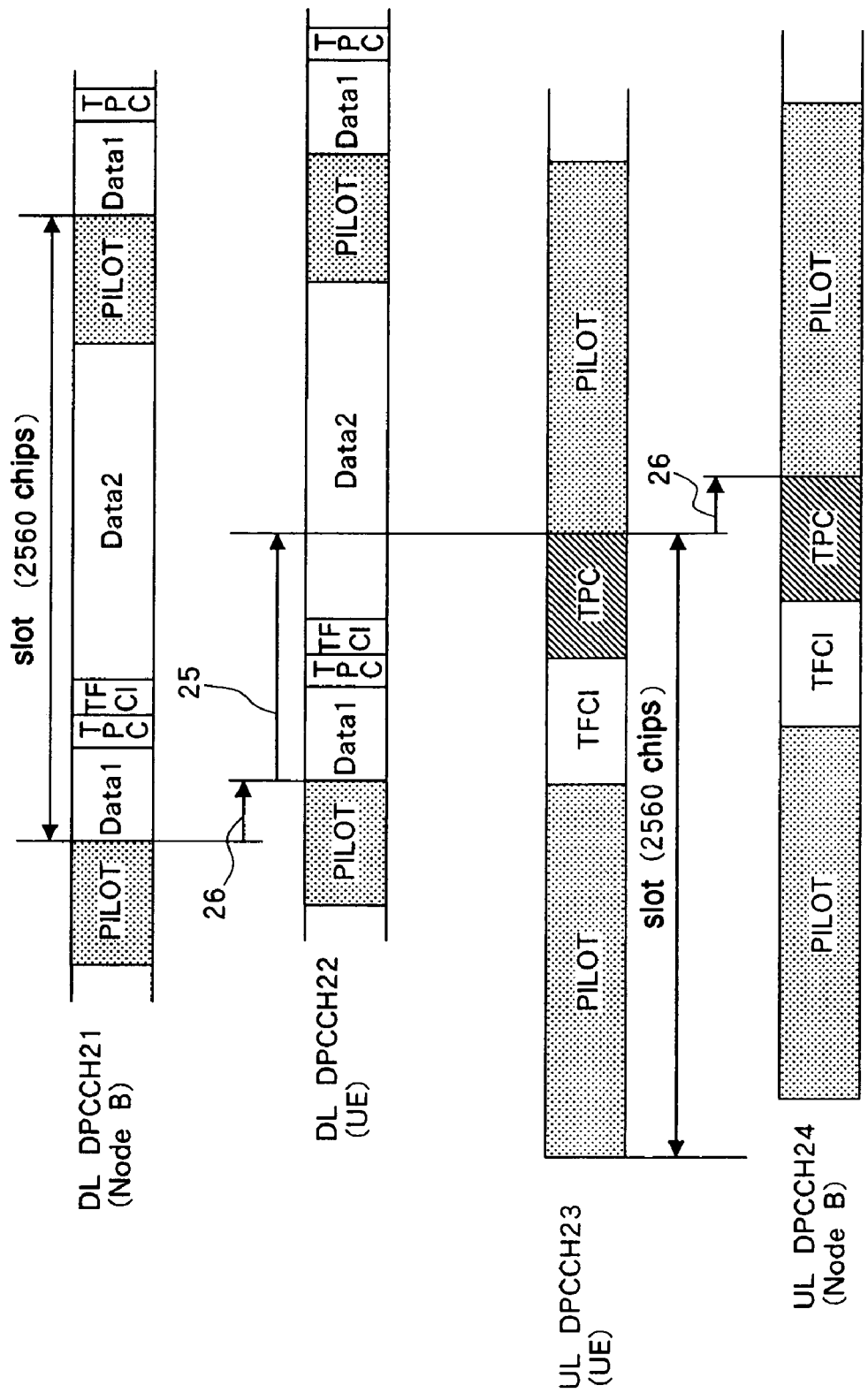
FIG. 2 is a view for explaining the timing and propagation delay of dedicated physical control channels.
Figure 3:
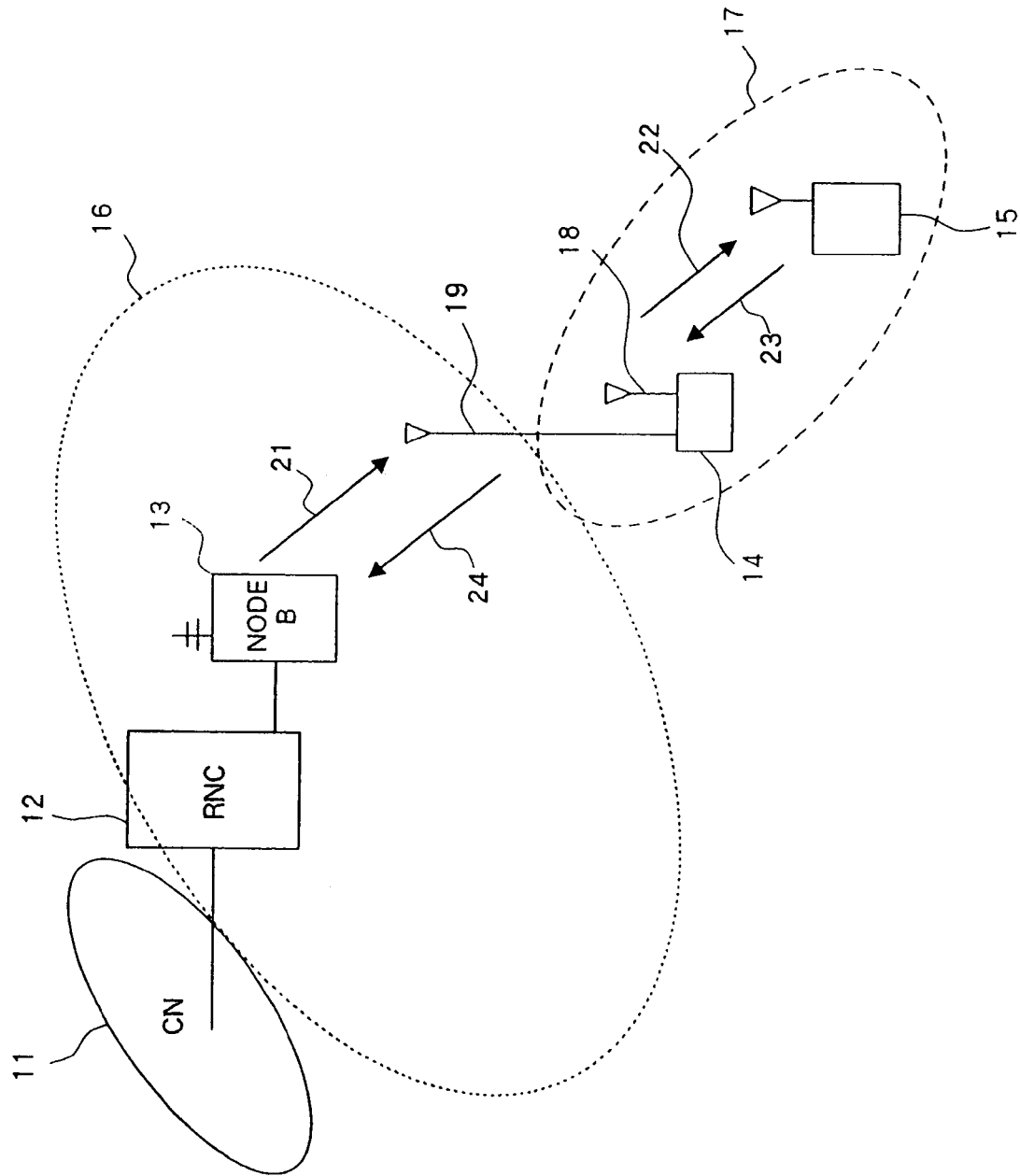
FIG. 3 shows each dedicated physical control channel in the system in FIG. 1.

Referring to FIGS. 2 and 3, the following explanation regards a typical method by which Node B (radio base station) 13 measures the radio propagation delay difference between Node B 13 and mobile station 15.

FIG. 2 shows the radio signal timing of downlink and uplink Dedicated Physical Control Channels (DPCCH) in a W-CDMA mobile communication system. In addition, FIG. 3 shows these DPCCH on the system of FIG. 1. DL (DownLink) DPCCH 21 is the DPCCH that is transmitted from Node B 13, and UL (UpLink) DPCCH 24 is the DPCCH that is received by Node B 13. In addition, DL DPCCH 22 is the DPCCH that is received by mobile station 15, and UL DPCCH 23 is the DPCCH that is transmitted from mobile station 15.

In Node B 13, propagation delay 26 is calculated from the difference in timing between the DL DPCCH 21 that Node B 13 transmits and UL (UpLink) DPCCH 24 that Node B 13 receives from a mobile station and the difference in timing DL-UL timing offset 25 between DL and UL that is prescribed by the system.

DL-UL timing offset 25 is the difference in timing in mobile station 15 between the reception timing of the radio signal DL DPCCH 22 from Node B 13 to mobile station 15 and the transmission timing of radio signal UL DPCCH 23 from mobile station 15 to Node B 13; and this timing offset is determined to be 1024 chip according to specifications in a W-CDMA mobile communication system. Regarding downlink radio signals, propagation delay 26 is the difference between the transmission timing (DL DPCCH 21) from Node B 13 and the reception timing (DL DPCCH 22) in mobile station 15. The same explanation holds for an uplink radio signal. In this case, Node B 13 detects the timing difference between slot timing 27 of DL DPCCH 21 that Node B 13 itself transmits and slot timing 28 of UL DPCCH 24 that is received from mobile station 15 and calculates the propagation delay from the following relation:

propagation delay={(timing difference between *DL BPCCH* 21 and *UL DPCCH* 24)−(*DL-UL* timing offset 25)}/2

Figure 4:
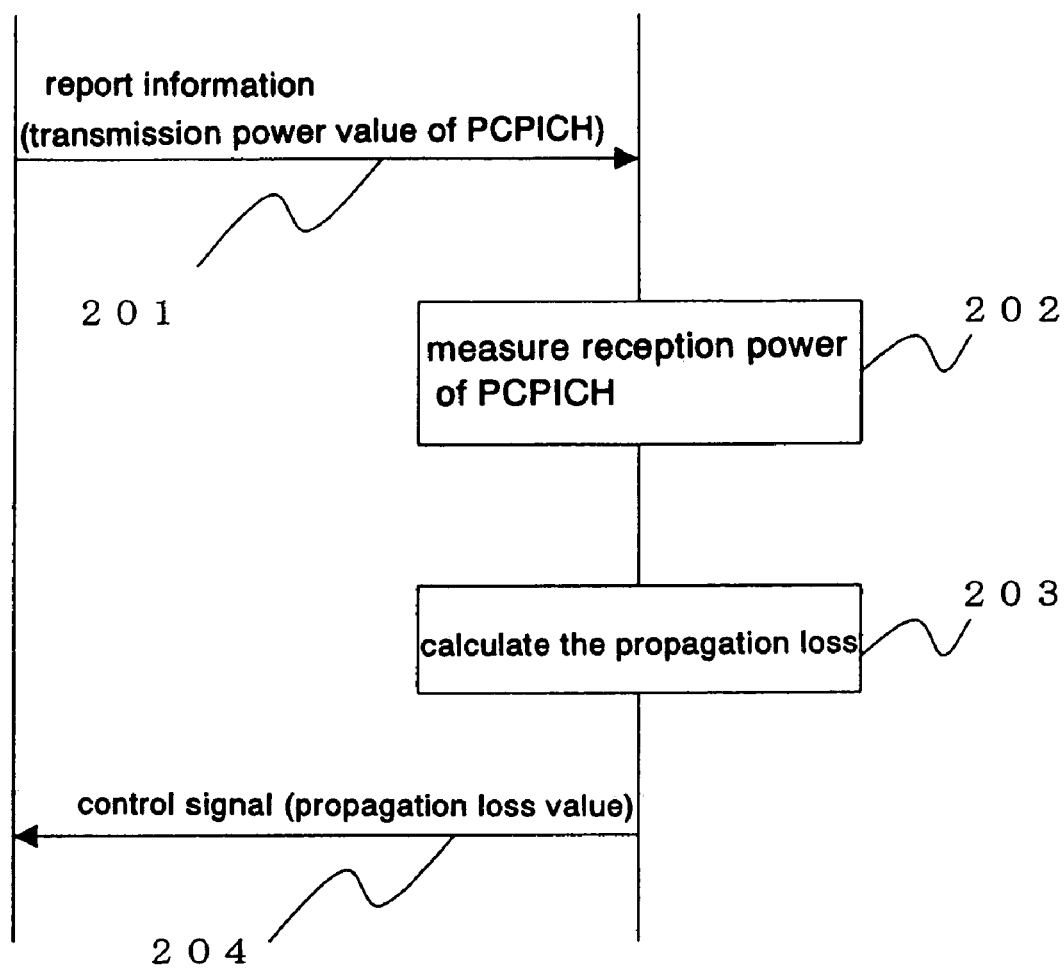
FIG. 4 is a sequence chart for explaining the method of calculating propagation loss.

Referring to FIG. 4, the following explanation regards a typical method of calculating the propagation loss in a mobile station in a W-CDMA mobile communication system.

FIG. 4 is a sequence chart showing the procedures by which mobile station 15 measures the propagation loss of a radio signal between Node B (radio base station) 13 and mobile station 15 and reports this propagation loss to Node B 13.

Radio base station (Node B) 13 first transmits report information that includes transmission power value information of the primary common pilot channel (PCPICH) to mobile station 15 (Step 201). Mobile terminal 15 then measures the reception power of the primary common pilot channel that it has received (Step 202), whereupon mobile station 15 calculates the propagation loss from the difference between the reception power value of the primary common pilot channel that mobile station 15 has received and the transmission power value information of the primary common pilot channel that is included in the report information received from Node B 13 (Step 203), and reports the propagation loss value that has been calculated to Node B 13 (Step 204).

The method of calculating propagation loss in this Step 203 can be represented by the following formula:

propagation loss=*PCPICH* transmission power value− *PCPICH* reception power value The foregoing explanation regarded a typical method of calculating the propagation loss and propagation delay in a W-CDMA mobile communication system using FIGS. 2 to 4. The following explanation regards a method of using the propagation loss and propagation delay that have been thus calculated to implement the service area determination method of the present embodiment for determining whether mobile station 15 is within service area 17 of repeater 14 or within service area 16 of Node B 13.

Figure 5:
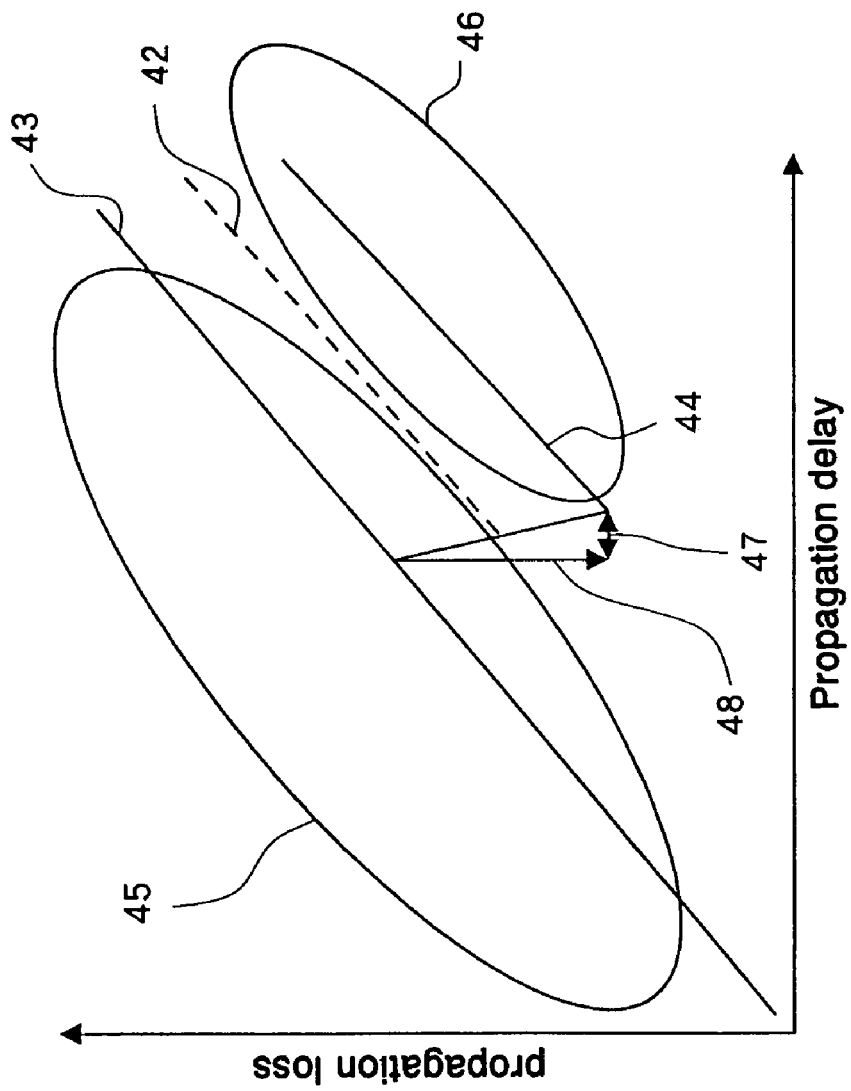
FIG. 5 shows the propagation delay-propagation loss table for explaining the service area determination method according to an embodiment of the present invention.

In the service area determination method of the present embodiment, Node B 13 uses a propagation delay-propagation loss table that has been set in advance such as shown in FIG. 5, the information of the propagation delay 26 that was calculated by Node B 13 and that is shown in FIG. 2, and the propagation loss information that was reported from mobile station 15 as shown in FIG. 4 to determine whether mobile station 15 is within service area 17 that is realized by repeater 14. Determination threshold value curve 42 that is shown in FIG. 5 is used for the determination.

It is here assumed that the power gain due to repeater 14 in the downlink (Node B 13→mobile station 15) direction is uniform. It is further assumed that propagation delay-propagation loss table such as shown in FIG. 5 is stored in advance in Node B 13. The relation between propagation delay and propagation loss in service area 16 (FIG. 1) that is realized by Node B 13 is represented by ideal curve 43. However, due to the addition of control delay 47 within repeater 14 and power gain 48 in repeater 14, the relation between propagation delay and propagation loss in service area 17 (FIG. 1) that is realized by repeater 14 is represented by ideal curve 44.

Area 45 in the vicinity of ideal curve 43 is the area that can be predicted to contain the relation between propagation delay and propagation loss when mobile station 15 is within service area 16 of Node B 13, and area 46 in the vicinity of ideal curve 44 is the area in which the effect of control delay and power gain upon area 45 that is brought about by repeater 14 has been taken into consideration.

Node B 13 determines whether the relation between the propagation delay that was measured by Node B 13 by means of the method that was explained using FIG. 2 and FIG. 3 and the propagation loss that was reported from mobile station 15 by means of the method that was shown in FIG. 4 is contained within area 45 or area 46 of propagation delay-propagation loss table 41; and determines that mobile station 15 is within service area 16 of Node B 13 when the relation between propagation delay and propagation loss is within area 45, and determines that mobile station 15 is within service area 17 realized by repeater 14 when the relation is within area 46. In addition, determination threshold value curve 42 that is set between area 45 and area 46 is used to distinguish area 45 and area 46.

When this determination threshold value curve 42 is used, the relation between the propagation loss value and the propagation delay is determined to be contained in area 45 when the relation between the propagation loss value and the propagation delay is on the area-45 side of determination threshold value curve 42, and the relation between the propagation loss value and propagation delay is determined to be contained within area 46 when the relation is on the area-46 side of determination threshold value curve 42.

The following explanation regards the reasons that this method allows the determination of whether or not mobile station 15 is within service area 17 of repeater 14.

When the distance between Node B 13 and mobile station 15 increases, the propagation delay and propagation loss both increase. As a result, when mobile station 15 is within service area 16 of Node B 13, the relation between propagation delay and propagation loss is in the vicinity of ideal curve 43 in FIG. 5, i.e., is within area 45. However, when mobile station 15 is within service area 17 of repeater 14, the control delay of repeater 14 is added to the propagation delay of the radio path, and the program delay between Node B 13 and mobile station 15 therefore increases. In addition, the downlink radio signal from Node B 13 and the uplink radio signal from mobile station 15 are both first amplified at repeater 14 before being received at mobile station 15 and Node B 13, respectively, and the propagation loss is therefore decreased by the amount of the power gain of repeater 14. As a result, when mobile station 15 is within service area 17 of repeater 14, the relation between propagation loss and propagation delay between Node B 13 and mobile station 15 diverges greatly from the vicinity of ideal curve 43 in FIG. 5 and can be expected to fall within the vicinity of ideal curve 44, i.e., within area 46.

By using determination threshold value curve 42 that is provided between area 45 and area 46, mobile station 15 can be determined to be within service area 17 of repeater 14 when the relation between propagation delay and propagation loss is on the area-46 side of determination threshold value curve 42, and mobile station 15 can be determined to be within service area 16 of Node B 13 when the relation is on the area-45 side of determination threshold value curve 42.

By means of the service area determination method of the present embodiment, in a CDMA mobile communication system in which repeaters are interposed, Node B 13 is able to determine whether or not mobile station 15 is within service area 17 that is realized by repeater 14 based on the propagation delay and program loss between Node B 13 and mobile station 15.

In Node B 13, moreover, the subtraction of the previously known control delay of repeater 14 from propagation delay that has been reported from mobile station 15 enables the calculation of the propagation delay that is caused by the propagation path even when mobile station 15 is within service area 17 that is realized by repeater 14, whereby an accurate position information detection service can be provided.

In addition, Node B 13 is able to receive notification from repeater 14 indicating the degree to which repeater 14 amplifies each of the uplink line and downlink line by radio gain, and, by adding this power gain that is due to repeater 14 to the propagation loss that has been calculated, is able to apply the appropriate correction and implement accurate transmission power control even when the radio amplified gain by repeater 14 differs for the uplink and downlink directions.

Second Embodiment

The following explanation regards the service area determination method according to the second embodiment of the present invention.

Figure 6:
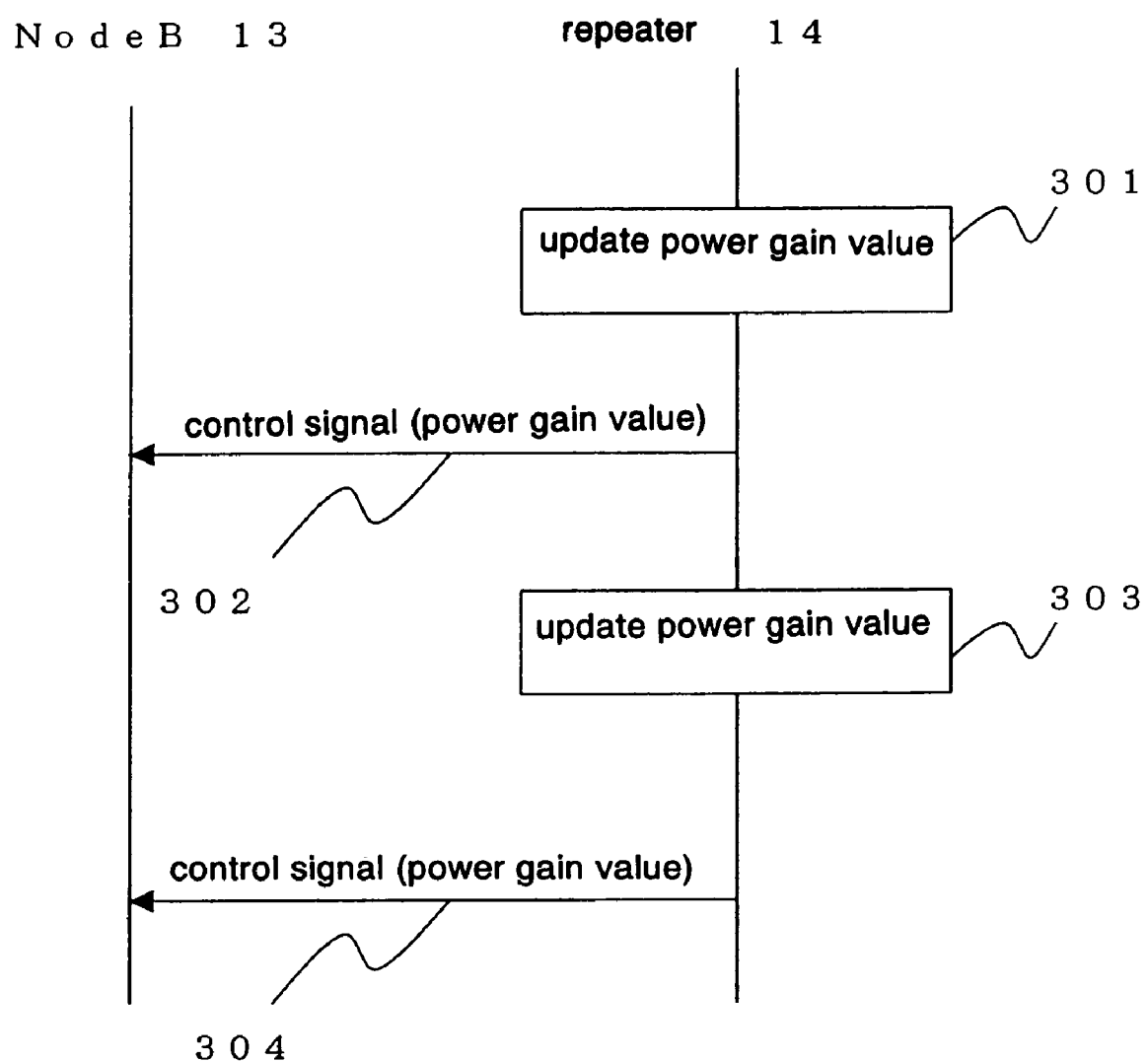
FIG. 6 is a sequence chart for showing the method of reporting the power gain value in the second embodiment of the present invention.

In the first embodiment, it was assumed that the power gain of repeater 14 was uniform regardless of the passage of time. However, in some cases, the power gain is changed with time in repeater 14. Thus, when power gain 48 in repeater 14 that is shown in FIG. 5 fluctuates with the passage of time, it is possible for power gain information to be reported periodically from repeater 14 to Node B 13, for example, as shown in FIG. 6 (Steps 302 and 304); and for Node B 13 that has received these reports, to periodically update the propagation delay-propagation loss table that is shown in FIG. 5 such that the service area determination can be performed appropriately even when the power gain in repeater 14 fluctuates together with the passage of time (Steps 301 and 303).

While preferred embodiments of the present invention have been described using specific terms, such description is for illustrative purposes only, and it is to be understood that changes and variations may be made without departing from the spirit or scope of the following claims.

What is claimed is:

1. A service area determination method in a CDMA mobile communication system that uses repeaters, said service area determination method determining in a radio base station whether a mobile station is within the service area of a repeater or within the service area of a radio base station; said service area determination method comprising steps of:

storing in advance in a radio base station a propagation delay-propagation loss table in which a first area and a second area are set in advance, said first area being an area that is predicted to contain the relation between propagation delay and propagation loss when a mobile station is within the service area of a radio base station, and said second area being an area in which the effect of the control delay and power gain of a repeater upon said first area is taken into consideration;

in the radio base station, using the difference in timing between a downlink dedicated physical control channel and an uplink dedicated physical control channel to calculate propagation delay;

determining whether the relation between a propagation loss value that is reported from the mobile station to the radio base station and said propagation delay that has been calculated in the radio base station is contained in said first area or contained in said second area in said propagation delay-propagation loss table; and determining that the mobile station is within the service area of the radio base station if the relation between propagation delay and propagation loss value is contained in said first area in said propagation delay-propagation loss table, and determining that the mobile station is within the service area of the repeater if contained in said second area.

2. A service area determination method according to claim 1, wherein said step of using the difference in timing between a downlink dedicated physical control channel and an uplink dedicated physical control channel to calculate propagation delay in the radio base station is:

a step of using a downlink-uplink timing offset, which is the difference in timing between the uplink radio line and the downlink radio line that are prescribed by the system to calculate the propagation delay by means of the formula:

{(timing difference between downlink dedicated physical control channel and uplink dedicated physical control channel)−(downlink-uplink timing offset)}/2.

3. A service area determination method according to claim 1, wherein said step of determining whether the relation between a propagation loss value that has been reported from the mobile station to the radio base station and said propagation delay that has been calculated in the radio base station is contained within said first area or contained within said second area in said propagation delay-propagation loss table is:

a step of using a determination threshold value curve that is set between said first area and said second area, whereby the relation between the propagation loss value and the propagation delay is determined to be contained within said first area when the relation between the propagation loss value and propagation delay is on said first-area side of said determination threshold value curve; and said relation between the propagation loss value and the propagation delay is determined to be contained within said second area when said relation between the propagation loss value and the propagation delay is on said second-area side of said determination threshold value curve.

4. A service area determination method according to claim 2, wherein said step of determining whether the relation between a propagation loss value that has been reported from the mobile station to the radio base station and said propagation delay that has been calculated in the radio base station is contained within said first area or contained within said second area in said propagation delay-propagation loss table is:

a step of using a determination threshold value curve that is set between said first area and said second area, whereby the relation between the propagation loss value and the propagation delay is determined to be contained within said first area when the relation between the propagation loss value and propagation delay is on said first-area side of said determination threshold value curve; and said relation between the propagation loss value and the propagation delay is determined to be contained within said second area when said relation between the propagation loss value and the propagation delay is on said second-area side of said determination threshold value curve.

5. A service area determination method according to claim 1, further provided with a step of using power gain information that has been reported from said repeater to periodically update said second area of said propagation delay-propagation loss table that is stored.

6. A service area determination method according to claim 2, further provided with a step of using power gain information that has been reported from said repeater to periodically update said second area of said propagation delay-propagation loss table that is stored.

7. A service area determination method according to claim 3, further provided with a step of using power gain information that has been reported from said repeater to periodically update said second area of said propagation delay-propagation loss table that is stored.

8. A service area determination method according to claim 4, further provided with a step of using power gain information that has been reported from said repeater to periodically update said second area of said propagation delay-propagation loss table that is stored.

* * * * *